United States Patent [19]

Pietsch

[11] 4,358,966
[45] Nov. 16, 1982

[54] METHOD OF MAKING A CIRCULAR WEDGE FOR USE AS AN ADJUSTING ELEMENT IN A PRINTING PRESS OR THE LIKE

[75] Inventor: Erich Pietsch, Offenbach-Bieber, Fed. Rep. of Germany

[73] Assignee: M.A.N.-Roland Druckmaschinen Aktiengesellschaft, Fed. Rep. of Germany

[21] Appl. No.: 186,648

[22] Filed: Sep. 12, 1980

[30] Foreign Application Priority Data

Sep. 17, 1979 [DE] Fed. Rep. of Germany ... 7926349[U]

[51] Int. Cl.³ .................. B23K 31/02; B23P 15/00
[52] U.S. Cl. ............................ 74/567; 72/379; 29/DIG. 37; 29/428; 228/173 C
[58] Field of Search .............. 228/152, 173 C; 72/379; 74/567; 29/DIG. 3, DIG. 37, 428, 469.5

[56] References Cited

U.S. PATENT DOCUMENTS 2,661,444 12/1953 Ott .................................. 74/567
2,793,421 5/1957 Brumbaugh .................. 228/152 X
2,979,812 4/1961 Russell .......................... 72/379 X
3,605,248 9/1971 Yoshikawa .................. 228/173 C

FOREIGN PATENT DOCUMENTS 275842 8/1927 United Kingdom ............ 74/567

Primary Examiner—Kenneth J. Ramsey
Attorney, Agent, or Firm—Leydig, Voit, Osann, Mayer & Holt, Ltd.

[57] ABSTRACT

The method of making an adjustable circular wedge which includes the steps of deforming a flat strip of metal by embossment to form a blank having a base side and a longitudinally extending tapering bead presenting a linear wedge surface, with the bead stopping short of the ends of the strip to define flat end portions. The end portions are bent sharply away from the base side of the blank at an angle of 90 degrees. The blank is wrapped about a cylindrical mandrel so that the base side of the strip is formed into a circular inner wall and so that the presented surface of the bead becomes a spiral outer wall to define, with the inner wall, a circular wedge. The flat end portions are then secured rigidly together by welding in face-to-face engagement to form a radially extending arm on the circular wedge for adjustment purposes. It is preferred in the bending step that the bending is along bend lines which intersect the respective ends of the bead for reinforcement of the bent corners.

3 Claims, 13 Drawing Figures

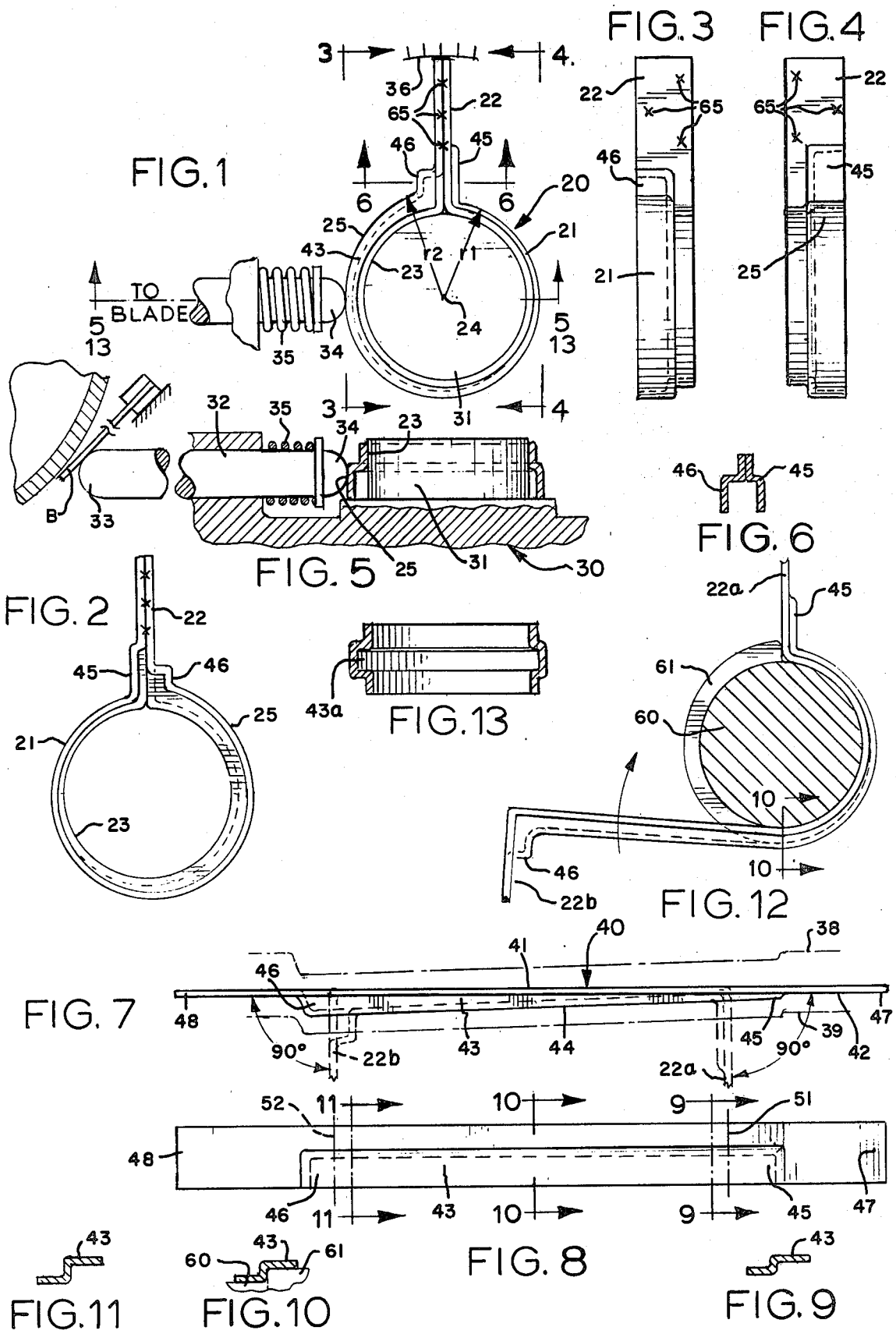

METHOD OF MAKING A CIRCULAR WEDGE FOR USE AS AN ADJUSTING ELEMENT IN A PRINTING PRESS OR THE LIKE

The ink fountain in a printing press commonly employs a fountain blade, the edge of which cooperates with the surface of the fountain roller to define the thickness of the ink film which is fed to the press rollers. For many years it was common to employ adjusting screws spaced at close intervals along the blade for the purpose of manually adjusting the thickness of the ink film from point to point. While screw threads for this purpose are still in use it has been more common to employ rockable eccentrics for manual adjustment of pins or plungers spaced along the blade. Because of the sensitivity of the adjustment and the necessity for making the adjustment at each point exactly reproducible it has been necessary to make the eccentrics as a machined part formed to a high standard of precision. This has made the eccentrics expensive on a per piece basis and since many such eccentrics are required for a single ink fountain this has added considerably to the total cost of the press, particularly in the case of a press having a substantial width.

It is, accordingly, an object of the invention to provide a method of making eccentric adjusting elements for dosing of ink at closely spaced points in an ink fountain in the form of a circular wedge presenting a spiral outer wall which permits manufacture from strip stock in lieu of machining to achieve economy combined with a high order of accuracy.

It is a related object to provide a method of making an eccentric, or spiral, adjusting element for use as an ink dosing element in a printing press which is capable of being formed in a few simple steps and using simple low cost tooling.

It is a related object to provide an ink flow adjusting element for a printing press which, although manufactured of relatively thin strip steel stock is inherently strong and rigid having a total useful life fully equal to that of equivalent devices which must be expensively machined out of solid stock to accurate tolerances.

Other objects and advantages will become apparent upon reading the attached detailed description and upon reference to the drawings in which:

FIG. 1 is a plan view of an adjusting element in the form of a circular wedge constructed in accordance with the present invention.

FIG. 2 is a bottom view of the structure shown in FIG. 1.

FIGS. 3 and 4 are respective side views of the structure shown in FIG. 1.

FIG. 5 is a vertical section taken along line 5—5 in FIG. 1.

FIG. 6 is a vertical section taken along line 6—6 in FIG. 1.

FIG. 7 is an edge view of blank formed of strip stock and employed in the method of the invention.

FIG. 8 is a face view of the blank shown in FIG. 7.

FIGS. 9, 10 and 11 are cross sectional views taken along corresponding section lines in FIG. 8 and FIG. 12.

FIG. 12 shows the wrapping of the blank about a cylindrical mandrel so that the presented surface of the bead becomes a spiral outer wall to define, with the inner wall, a circular wedge.

FIG. 13 is a cross sectional view taken through the circular wedge along line 13—13 in FIG. 1 showing a modified form of the present invention.

While the invention has been described in connection with a preferred embodiment it is understood that there is no intention to limit the invention to the particular embodiment shown but on the contrary it is intended to cover the various alternative and equivalent procedures included within the spirit and scope of the appended claims.

Turning to the drawing there is disclosed an adjusting element 20 having an annular portion 21 from which extends an integral arm 22. The annular portion 21 has a cylindrical inner wall 23 centered about a central axis 24 and an outer wall 25. The outer wall is eccentric and, more specifically, lies in a spiral locus having a radius which varies from a minimum at r1 to a maximum at r2. The surfaces 23, 25 define between them what may conveniently be called a circular wedge.

In a typical use of the device it is mounted for manual rocking movement to actuate one of the adjusting pins engaging the fountain blade in an ink fountain, it being understood that such devices are employed in multiple along the length of the blade for the positioning of pins spaced every few inches. The device 20 may, for example, be mounted upon the frame 30 of a fountain snugly surrounding a cylindrical embossment 31 thereon as shown in FIG. 5.

Extending radially from the cylindrical embossment 31 is an adjusting pin 32 having an inner end 33 which bears against the edge portion of the fountain blade B and an outer end 34 which is urged against the spiral surface 25 by means of a take-up spring 35. It will be apparent that by horizontally swinging the arm 22, for example, with respect to a calibrated scale 36 (FIG. 1), the gap at the edge of the blade B, which determines the thickness of ink film, may be adjusted with a high degree of precision. It will be understood, nevertheless, that the mounting shown in FIG. 5 is simply representative and does not form a part of the present invention. It will also be understood that the pitch of the spiral, that is, the degree of eccentricity, of the surface 25 has been pictorially exaggerated in FIG. 1 and in the following figures; in a practical case a total throw of up to a millimeter or so is adequate.

In accordance with the invention the adjusting element 20, characterized as a circular wedge, including its adjusting arm are fabricated from a single strip of metal such as steel following the procedural steps to be outlined in the following paragraphs.

The process begins with a straight flat piece of metal which is formed, by a pair of cooperating dies indicated in phantom at 38, 39 into a blank 40 having a base side 41 and an outer, or presented, side 42. The dies are shaped to form a longitudinally extending tapering bead 43 which presents a linear wedge surface 44. The bead has a low end 45 and a high end 46, both of which terminate short of the ends of the blank to define flat end portions 47, 48, respectively.

As a next step in the procedure, the end portions 47, 48 are bent sharply away from the base side 41 of the blank at 90 degrees about bend lines, respectively, indicated at 51, 52 (FIG. 8) to form arm elements 22a, 22b. In carrying out the present method in its preferred form, the bend lines 51, 52 intersect the respective ends 45, 46 of the bead so that the sharp corners formed by the bending operation are self-reinforced. It will be apparent to one skilled in the art that by use of suitable bending dies, not forming a part of the present invention, the bend can be made without locally crushing the bead.

As the next step in the procedure the blank 40, with its ends pre-bent, is wrapped about a cylindrical mandrel 60 as shown in FIG. 12, the mandrel having a spiral shoulder 61 which extends therearound, the shoulder being of progressive height so that it nests fully within the bead as indicated in phantom in FIG. 10.

When the wrapping is completed to 360 degrees, the base side 41 of the blank becomes the cylindrical inner wall 23 and the presented wedge surface 44 of the bead becomes the spiral outer wall 25, to define between them the circular wedge 21. The flat bent-over end portions 22a, 22b come into face-to-face engagement to form the adjusting arm 22, being rigidly secured together by spot welding or equivalent as indicated at 65 (FIG. 1).

It will be apparent that the steps employed in forming the device are individually economical, lending themselves well to high production techniques. Because of the large number of such adjusting devices employed in each ink fountain the aggregate saving is considerable over the finely machined elements which have been required in the past. While the adjusting element resulting from the present procedures is formed of relatively thin metal stock it is, because of the combination of the embossment, bending and wrapping operations, transformed into a structure having a high degree of rigidity in all planes.

After forming the device may, as an optional but preferred step, be form-stamped or "coined" to precise dimensions so that each adjusting element of the series falls within sufficiently close tolerances as to make its use interchangeable with other similar elements and so that each element may be used with an identically calibrated scale 36 without necessity for separate or special calibration.

While the invention has been described above in connection with a simplified embodiment in which the bead 43 is formed along one edge of the metal stock, it will be apparent that minor modifications are possible without departing from the invention including the central positioning of the bead as set forth, at 43a, in cross section in FIG. 13.

What I claim is:

1. The method of making a circular wedge for use as an adjusting element in a printing press or the like which comprises deforming a flat strip of metal by embossment to form a blank having a base side and a longitudinally extending tapering bead presenting a linear wedge surface, with the bead stopping short of the ends of the strip to define flat end portions, bending the end portions sharply away from the base side of the blank at an angle of 90 degrees, wrapping the blank about a cylindrical mandrel so that (a) the base side of the blank is formed into a cylindrical inner wall, (b) the presented surface of the bead becomes a spiral outer wall to define, with the inner wall, a circular wedge, and (c) the flat end portions are in face-to-face engagement, and then securing the end portions rigidly together to form a radially extending arm on the circular wedge.

2. The method as claimed in claim 1 in which the bending is along bend lines which intersect the respective ends of the bead for reinforcement of the bent corners.

3. As an article of manufacture a circular wedge resulting from the use of the method of claim 1.

* * * * *